United States Patent [19]
Brittain et al.

[11] 3,801,916
[45] Apr. 2, 1974

[54] ELECTRO-CHEMICAL ODOMETER

[75] Inventors: William J. Brittain, Westcliff-on-Sea; Jaan Lindre, Hadleigh, both of England

[73] Assignee: Ford Motor Company, Dearborn, Mich.

[22] Filed: Oct. 13, 1972

[21] Appl. No.: 297,581

[30] Foreign Application Priority Data
Oct. 26, 1971   Great Britain.................... 49700/71

[52] U.S. Cl. ............................................. 324/182
[51] Int. Cl. ............................................. G04f 9/00
[58] Field of Search.................... 324/94, 182, 171; 235/151.32

[56] References Cited
UNITED STATES PATENTS
3,462,684   8/1969   Beusman........................ 324/94
3,290,669   12/1966   Mews............................ 324/94
3,718,861   2/1973   Ramsey.......................... 324/142

Primary Examiner—Alfred E. Smith
Attorney, Agent, or Firm—Robert W. Brown

[57] ABSTRACT

Described is an electro-chemical pulse counter suitable for use as a vehicle odometer. The pulse counter may include a number of identical stages, each of the stages having an electro-chemical cell. When DC current pulses pass between cell electrodes, metal is transferred from one electrode to another and this changes the cell's electrical resistance. If the DC pulses are related to distance traveled by a vehicle, the cell resistance is proportional thereto. This is detected by an AC signal applied to the electro-chemical cell. The AC signal does not change the cell's resistance.

3 Claims, 1 Drawing Figure

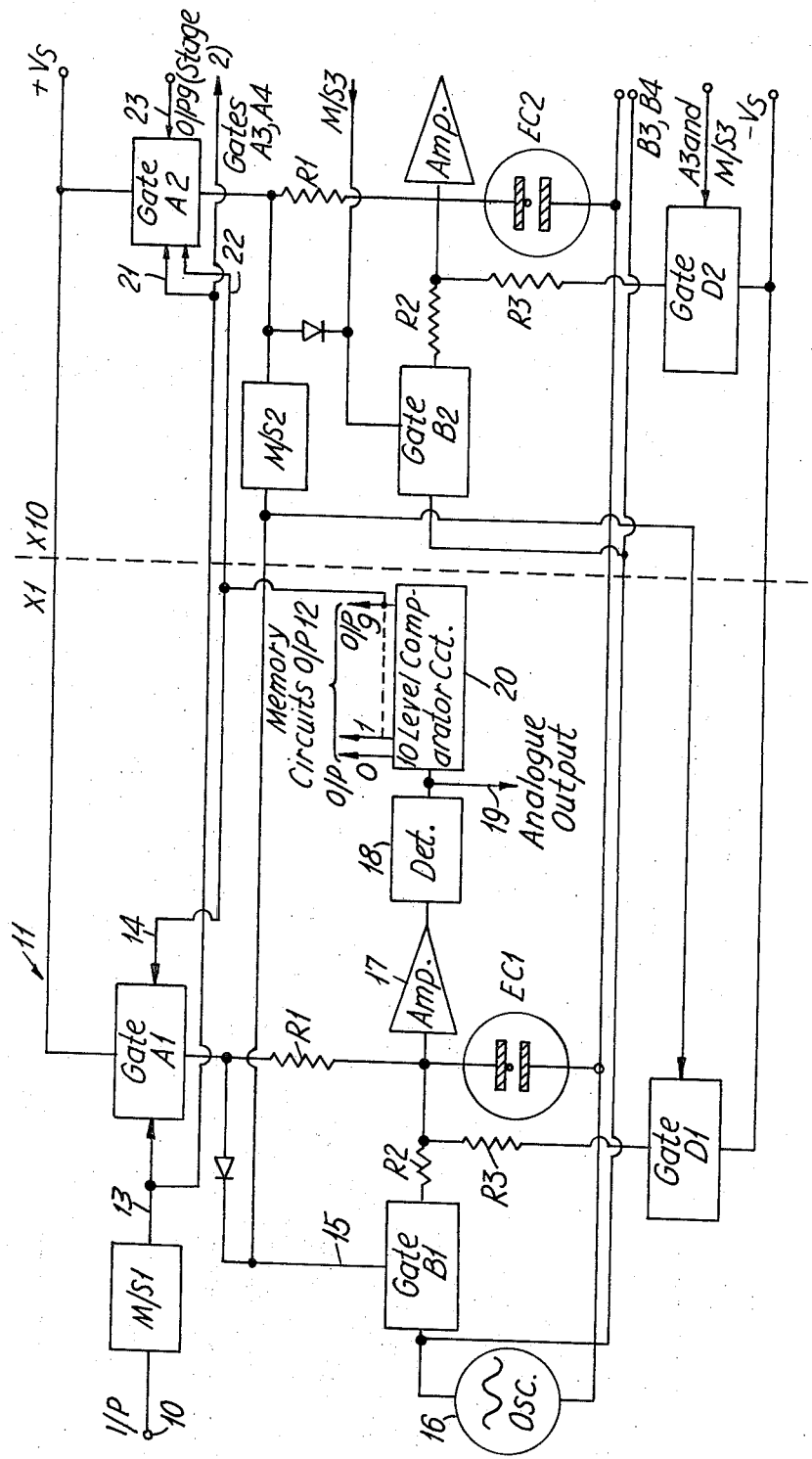

ELECTRO-CHEMICAL ODOMETER

DESCRIPTION OF THE INVENTION

This invention relates to a pulse counter suitable for use as a motor vehicle odometer.

Recent proposals for motor vehicle instrument assemblies have included systems in which the current electromechanical instruments are replaced by electronic systems wherein the information representing vehicle speed and other operating conditions of the vehicle and engine are displayed by electro-luminescent films, gas discharge devices or other devices which have no moving parts.

One instrument which raises particular problems is the vehicle odometer since the total distance reading of the odometer must be stored even when all the electrical systems of the vehicle are off and indeed even if the battery is removed from the vehicle.

The pulse counter odometer of the present invention depends for its operation on the properties of electro-chemical cells which comprise two electrodes immersed in an electrolyte. When a direct electrical current is passed through an electrochemical cell, metal is transferred from one electrode to the other. The metal can be transferred back by reversing the current and the mass of metal transferred is directly proportional to the electrical charge which has passed through the cell in accordance with Faraday's Law. The quantity of metal transfer can be measured as a change in resistance of the cell.

According to the invention a vehicle odometer has the following features:
a. a memory circuit comprising a plurality of electro-chemical cells is responsive to a train of electrical pulses each indicating that a certain distance has been traveled since the previous pulse,
b. each pulse causes the memory circuit to pass a predetermined charge through one or more of the electro-chemical cells thereby storing an indication of the total number of distance indicating pulses received; and
c. a read-out circuit is operable to produce a plurality of output signals each representative of the resistance of a respective one of the electro-chemical cells so that the output signals indicate the total number of distance indicating pulses received.

It is an advantage of the invention that the stored indication of total distance traveled in the form of metal transferred between electrodes is not lost when the electrical supply to the odometer is disconnected.

The invention will now be described with reference to the accompanying drawing which is a circuit diagram of a memory circuit for a vehicle odometer embodying the invention.

The odometer includes a transducer (not shown) coupled to a moving part of a motor vehicle for producing a train of pulses each indicating that a predetermined distance has been traveled since the previous pulse. These pulses are applied to the input 10 of a memory circuit 11 which counts the pulses and stores an indication of the total number of pulses it has received. The memory circuit generates a digital output representing the total number of pulses.

A digital display device (not shown) is connected to the memory circuit outputs 12 and produces a visible digital display of the count stored in the memory circuit. The display device has no moving parts and functions by electro-luminescence, gas discharge, or other phenomena whereby electrical signals are converted into light. A convenient form of display device uses a layer of d.c. electro-luminescent material sandwiched between electrodes arranged for selectively energizing different areas of the electro-luminescent material. Such a display has the advantage that the odometer display can be integrated in a single planar structure with the display of other vehicle instruments such as speedometer, fuel gauge, etc., to produce an instrument system which is easily assembled in a vehicle and takes up little space.

The memory circuit 11 comprises a plurality of decades. Only the first decade which counts units of distance and part of the second decade which counts tens of units of distance are shown in the drawing.

Each decade includes an electro-chemical cell EC1, EC2. The electro-chemical cell EC1 has one electrode connected directly to earth and the other electrode connected:

a. to supply voltage $+V_S$ through a resistance $R_1$ and gate A1 so that a predetermined current is passed through the cell when gate A1 is opened;
b. to supply voltage $-V_S$ through resistance $R_3$ and gate D1 so that a current passes through the cell in the opposite direction to said predetermined current when gate D1 is open.

Cells EC2, EC3,.. are similarly connected to $+V_S$ and $-V_S$.

Incoming pulses are applied to a monostable circuit M/S1 which, in response to each pulse, produces an output pulse on line 13 of predetermined duration and opens gate A1 for said predetermined duration unless the gate is closed by a signal on line 14 as described below. Thus, each time that gate A1 is opened a predetermined charge passes through the electrochemical cell EC1, and its resistance is changed by a known amount determined by the properties of the cell. The first nine pulses cause said predetermined charge to pass through EC1 and its resistance increases in nine increments.

When gate A1 is closed gate B1 opens (gate B is closed by an input on line 15) and an oscillator 16 is connected in series with resistance $R_2$ and the cell EC1. An AC voltage is developed across the cell which is proportional to the resistance of the cell. The net charge passing through the cell is zero so that there is no change of resistance of the cell even if the AC current is passed through the cell for long periods. The AC voltage across the cell is amplified by an amplifier 17 and rectified and smoothed in a detector circuit 18 to produce an analogue signal 19 representative of the count stored in the cell EC1. An analogue-to-digital converter comprising a 10 level comparator circuit 20 produces a signal on one of 10 output lines 12 indicating the stored count.

When the count in EC1 reaches 9 the signal on line O/P 9 closes gate A1 and prepares gate A2 of stage 2 so that the next pulse from M/S1 opens gate A2 thereby connecting EC2 to $+V_S$ through resistance $R_1$ and increases the count in EC2 by one.

Gate A2 is opened whenever signals are applied to both "open" inputs 21 and 22 unless a signal is applied to its "closed" input 23 connected to O/P 9 of stage 2.

The output from A2 starts M/S 2 which closes gate B1 and opens gate D1 for a predetermined time during which a reverse current passes through EC1 reducing the stored count to zero. Gate A1 is then no longer kept closed by O/P 9 and the circuit is ready to count further input pulses.

Although we have described only the connection between the first and second stages, the complete circuit will now be readily understood since the connections between the remaining stages follow the same pattern.

We claim:

1. An electro-chemical pulse counter suitable for use as an odometer, which comprises: an electro-chemical cell including first and second electrodes immersed in an electrolyte, said electrodes being capable of reversible metal transfer from one electrode to the other upon the application across them of a DC voltage; an AC oscillator having first and second terminals, said first terminal of said oscillator being connected to said first electrode of said electro-chemical cell; a first gate, said first gate having one of its terminals connected to said second terminal of said oscillator; a first resistor having first and second terminals, said first terminal of said first resistor being connected to another terminal of said first gate and said second terminal of said first resistor being connected to said second electrode of said electro-chemical cell; a second resistor having first and second terminals, said first terminal of said second resistor being connected to said second electrode of said electro-chemical cell; circuit means for controlling said first gate; and circuit means for applying a train of fixed duration pulses to said second terminal of said second resistor, thereby, to produce a train of unidirectional current pulses through said electrochemical cell.

2. An electro-chemical pulse counter in accordance with claim 1, wherein said circuit means for applying a train of fixed duration pulses to said second terminal of said second resistor includes a second gate, said second gate having an output line connected to said second resistor, said circuit means for controlling said first gate comprising a line connecting said first gate with said second gate output line, said first gate being open when said second gate is closed; said electro-chemical pulse counter further comprising circuit means for amplifying AC voltages across said electro-chemical cell and a comparator coupled to said amplifying circuit means, said comparator having a plurality of output lines, one of said comparator output lines being connected to said second gate.

3. An electro-chemical pulse counter in accordance with claim 2, which further comprises: a second electro-chemical cell; a third gate having an input line coupled to said one of said comparator output lines and having an output line coupled to said second electro-chemical cell; and a fourth gate having a control input coupled to said output line of said third gate, the output line of said fourth gate being coupled to said first electro-chemical cell, said fourth gate when open reversing the direction of current through said first electro-chemical cell.

* * * * *